(12) United States Patent
Tsuji et al.

(10) Patent No.: US 7,781,371 B2
(45) Date of Patent: Aug. 24, 2010

(54) FILTER CATALYST

(75) Inventors: Makoto Tsuji, Kakegawa (JP); Norihiko Aono, Kakegawa (JP); Daisuke Oki, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 709 days.

(21) Appl. No.: 11/267,280

(22) Filed: Nov. 7, 2005

(65) Prior Publication Data

US 2006/0100101 A1   May 11, 2006

(30) Foreign Application Priority Data

Nov. 11, 2004   (JP) .............................. 2004-327697

(51) Int. Cl.
*F01J 33/10* (2006.01)
*B01J 21/00* (2006.01)
(52) U.S. Cl. ......................................... 502/439; 60/299
(58) Field of Classification Search .................... 60/299
See application file for complete search history.

(56) References Cited

U.S. PATENT DOCUMENTS 5,855,854 A   1/1999 Shinzawa et al.
6,133,185 A   10/2000 Kinugasa et al.
6,265,342 B1   7/2001 Lim et al.
2004/0053781 A1   3/2004 Okawara

FOREIGN PATENT DOCUMENTS

| EP | 0 773 057 | 5/1997 |
| EP | 1 034 832 | 9/2000 |
| JP | EP 0 731 256 A2 | 9/1996 |
| JP | A 9-173866 | 7/1997 |
| JP | 2003154223 | * 7/2002 |
| JP | A 2002-295228 | 10/2002 |
| JP | EP 1 398 081 A1 | 3/2004 |

* cited by examiner

*Primary Examiner*—Melvin C Mayes
*Assistant Examiner*—Kenneth Vaden
(74) *Attorney, Agent, or Firm*—Oliff & Berridge, PLC (57) ABSTRACT

A filter catalyst of the present invention is comprised of a catalyst-supporting substrate 1, and catalytic portions 5, 6 for purifying an exhaust gas. The catalytic portions includes the first catalytic portion 5 for purifying HC, CO and $NO_x$, and the second catalytic portion 6 for purifying the particulates. The first catalytic portion 5 is formed on a surface of at least a portion of the cellular wall 40, and the second catalytic portion 6 is formed on an inside surface of the pores. In the filter catalyst of the present invention purifying ability of the exhaust gas is increased, and the filter catalyst of the present invention can suppress rise of the pressure loss of the exhaust gas.

5 Claims, 5 Drawing Sheets

FILTER CATALYST

BACKGROUND OF THE INVENTION

1. Field of the Invention

The present invention relates to a filter catalyst which removes particulates contained in an exhaust gas exhausted from an internal-combustion engine such as a diesel engine, and which purifies HC, CO, $NO_x$ simultaneously.

2. Description of the Related Art

In the exhaust gas exhausted from the internal-combustion engine such as the diesel engine etc., components such as HC, CO, $NO_x$ etc. as well as particulates are contained. The particulates contain substance which is harmful to a human body and which requires to be removed from environmental aspect.

For purification of such exhaust gas, a filter catalyst which is sometimes called as diesel particulate filter (DPF) were used. The filter catalysts are set forth in Japanese Unexamined Patent Publication (KOKAI) No. 9-173,866 and Japanese Unexamined Patent Publication (KOKAI) No. 2002-295, 228. In conventional filter catalysts, a catalytic layer was formed on a surface of a catalyst-supporting substrate. That is, the catalyst-supporting substrate made of a porous ceramic has plural cells and cellular wall provided with multiple continuous pores. The catalytic layer is composed of a loading layer made of a heat-resistant inorganic oxide such as alumina etc., and a catalytic metal loaded on the loading layer.

When the exhaust gas passes through ventilation holes formed by the multiple continuous pores of the catalyst-supporting substrate of which surface is coated by a catalytic layer, the filter catalyst captures the particulates and purifies the harmful components except for the particulates. Also, the catalytic layer formed on the catalyst-supporting substrate made of the porous ceramic decomposes the particulates.

If the ventilation holes sufficiently allowing the exhaust gas to pass through was not formed in the filter catalyst, the captured particulates deposit on the catalyst-supporting substrate to cause a pressure loss of the exhaust gas. For suppressing the pressure loss, forming a uniform catalytic layer on an inside surface of the pores of the catalyst-supporting substrate, was known. In this method, a loading layer of the catalytic layer for loading a catalytic metal thereon is produced by a slurry in which a heat-resistant inorganic oxide having small particle diameter is dispersed.

However, due to small particle diameter of the heat-resistant inorganic oxide, there was a problem that the catalytic layer has a lower gas dispersing property, and can not purify the gaseous component such as HC, CO, $NO_x$ etc. in the exhaust gas sufficiently.

To the contrary, when the catalytic layer is produced by the heat-resistant inorganic oxide of large particle diameter, there arose another problem. That is, although the gas dispersing property is increased, the loading layer closes the pores of the catalyst-supporting substrate to raise the pressure loss.

SUMMARY OF THE INVENTION

The present invention has been made in view of the above circumstances, and has an object to provide a filter catalyst in which purifying ability of the exhaust gas is increased, and which can suppress rise of the pressure loss of the exhaust gas.

For solving the above subject, inventors of the present invention repeated diligent researches about the manufacturing method of the filter catalyst. As a result, they have found out forming the catalytic layers having different characteristics on the catalyst-supporting substrate, can overcome the above subject.

The filter catalyst of the present invention is comprised of (i) a catalyst-supporting substrate including a cellular wall demarcating plural cells of which opposite end openings are sealed alternately, the cellular wall being provided with multiple continuous pores, (ii) a first catalytic portion formed on a surface of at least a portion of the cellular wall for decomposing and purifying a component to be purified contained (included) in the exhaust gas, and (iii) a second catalytic portion formed on an inside surface of the pores and forms a part of the cellular wall for decomposing and purifying a component to be purified contained (included) in the exhaust gas.

Also, the filter catalyst of the present invention is comprised of (i) a catalyst-supporting substrate including a cellular wall demarcating plural cells of which opposite end openings are sealed alternately, the cellular wall being provided with multiple continuous pores, and (ii) a catalytic portion formed on a surface of the cellular wall for purifying the exhaust gas being discharged from a diesel engine and containing HC, CO, $NO_x$ and particulates. The filter catalyst is characterized by that the catalytic portion for purifying the exhaust gas includes a first catalytic portion for purifying HC, CO and $NO_x$, and a second catalytic portion for purifying the particulates.

According to the filter catalysts of the present invention, the cellular wall is divided into the first catalytic portion and the second catalytic portion. The first catalytic portion formed on the surface of the cellular wall is excellent in a gas dispersing property, and the second catalytic portion formed on the inside surface of the pores is excellent in a gas passing-through property in the cellular wall. The first catalytic portion purifies HC, CO and $NO_x$ contained in the exhaust gas The second catalytic portion purifies the particulates contained in the exhaust gas, with suppressed rise of the pressure loss. That is, the multiple continuous pores on which the second catalytic portion is formed allow the exhaust gas to pass through them.

Thus, the filter catalyst of the present invention can achieve both of the increased purifying ability of the exhaust gas and the suppressed rise of the pressure loss.

The filter catalyst of the present invention is comprised of a catalyst-supporting substrate, a first catalytic portion, and a second catalytic portion.

The catalyst-supporting substrate of a honeycomb shape includes a cellular wall demarcating plural cells of which opposite end openings are sealed alternately, and the cellular wall is provided with multiple continuous pores. The plural cells are extended in a longitudinal direction of the cellular wall. By demarcating the plural cells by the cellular wall, and sealing the opposite end openings of the cells alternately, the exhaust gas flows the catalyst-supporting substrate in the following manner. That is, the exhaust gas flows into the cells of which upstream openings are opened (downstream openings are sealed) from the opened upstream openings.

Then, the exhaust gas passes through the pores of the cellular wall, flowing into the adjacent cells of which downstream openings are opened (upstream openings are sealed). The exhaust gas in the adjacent cells flows out from the opened downstream openings. When the exhaust gas passes through the pores, the particulates contained therein are captured.

The catalyst-supporting substrate is preferably made of a heat-resistant porous body. On account of heat-resistant property of the catalyst-supporting substrate, it can be formed the catalytic portion thereon stably. On account of porous property of the catalyst-supporting substrate, it can be provided with the multiple continuous pores for allowing the exhaust gas to pass therethrough. As the heat-resistant porous body, a cordierite, SiC and other heat-resistant ceramic can be listed.

As the catalyst-supporting substrate, a wall flow DPF (diesel particulate filter), ceramic foam filter, metal nonwoven DPF can be used. Among them, the wall flow DPF made of the cordierite (chemical composition: $2MgO-2Al_2O_3-5SiO_2$) which is known as the ceramic having a low coefficient of thermal expansion, is preferable.

The first catalytic portion formed on a surface of at least a portion of the cellular wall, decomposes and purifies component to be purified (briefly called as "purified component") contained in the exhaust gas, when the exhaust gas is flowing in the cells. Because the surface of the cellular wall is located at position where the exhaust gas flowed into the cells tends to contact therewith, the first catalytic portion can purify the purified component contained in the exhaust gas easily.

Also, because the first catalytic portion is formed on the surface of at least the portion of the cellular wall, having sufficient thickness, the exhaust gas can be dispersed into the first catalytic portion easily. That is, the first catalytic portion has high gas dispersing property. The first catalytic portion purifies the gaseous purified component such as HC, CO and $NO_x$ contained in the exhaust gas.

The second catalytic portion, formed on an inside surface of the pore, forms a part of the cellular wall. That is, the part of the cellular wall in which the second catalytic portion is formed, forms an exposed inner surface of the cellular wall. The second-catalytic portion sufficiently forms the part of the inner surface of the cellular wall, and can have a portion which does not form the inner surface of the cellular wall. That is, the first catalytic portion can be formed on the surface of the cellular wall in which the second catalytic portion is formed.

The second catalytic portion formed on the inside surface of the pore, decomposes and purifies a component contained in the exhaust gas to be purified (purified component). The pores on which the second catalytic portion is formed can allow the exhaust gas to pass through them. Thus, the part of the cellular wall where the second catalytic portion is formed can allow the exhaust gas to pass through it, suppressing rise of the pressure loss. The second catalytic portion purifies the exhaust gas when the exhaust gas passes through the pores formed in the cellular wall. As the purified component, particulates can be listed.

In an upstream area of the cellular wall the first catalytic portion is preferably formed, while in an area of the cellular wall where the first catalytic portion is not formed the second catalytic portion is preferably formed. The upstream side of the cellular wall corresponds to an upstream side of the exhausting system in which the exhaust gas is flowing. That is, forming the first catalytic portion in the upstream area of the cellular wall is preferable. The first catalytic portion formed in the upstream area of the cellular wall contacts with the higher temperature exhaust gas. Thus, an igniting property of the first catalytic portion is increased.

Also, reacting heat generated when the first catalytic portion purifies the purified component is transferred to the second catalytic portion, increasing an igniting property of the second catalytic portion. Further, because the particulates captured by the second catalytic portion is decomposed at once, the sufficient gas passing-through property can be maintained. Thus, rise of the pressure loss can be suppressed.

The first catalytic portion is preferably formed on the cellular wall in an area from the upstream end by $1/5$ to $3/5$ axial length of the cellular wall. Here, the axial direction corresponds to the direction where the tubular cells are extended with the first catalytic portion having the axial length within this range, the filter catalyst of the present invention can achieve both of the increased purifying ability and the suppressed rise of the pressure loss.

When the axial length of the first catalytic portion is smaller than $1/5$ of that of the cellular wall, the first catalytic portion is excessively short, whereby the purifying ability of the exhaust gas decreases. On the other hand, when the axial length of the first catalytic portion is larger than $3/5$ of that of the cellular wall, the second catalytic portion is excessively short, whereby the pressure loss at the second catalytic portion is risen.

As long as the first catalytic portion formed on the surface of at least the portion of the cellular wall can decompose and purify the purified component contained in the exhaust gas, construction of it is not limited. For example, the first catalytic portion is preferably composed of a first loading layer made of a heat-resistant inorganic oxide, and a first catalytic metal loaded thereon. The heat-resistant inorganic oxide is preferably at least one kind selected from a group consisting $Al_2O_3$, $SiO_2$, $TiO_2$, $ZrO_2$, $CeO_2$, oxides or transition metals, oxides of a rare-earth elements, a composite oxide of these oxides. The first catalytic metal is preferably at least one kind selected from a group consisting Pt, Pd, Rh, Ru, Ir, Au, Ag.

As long as the second catalytic portion formed on inside surface of the pores can decompose and purify the purified component contained in the exhaust gas, construction of it is not limited. For example, the second catalytic portion is preferably composed of a second loading layer made of a heat-resistant inorganic oxide, and a second catalytic metal loaded on it. The heat-resistant inorganic oxide is preferably at least one kind selected from a group consisting $Al_2O_3$, $SiO_2$, $TiO_2$, $ZrO_3$, $CeO_2$, oxides of transition metals, oxides of a rare-earth elements, a composite oxide of these oxides. The second catalytic metal is preferably at least one kind selected from a group consisting Pt, Pd, Rh, Ru, Ir, Au, Ag.

The first catalytic portion and the second catalytic portion can have the loading layers and the catalytic metals of the same construction or the different construction.

In the filter catalyst of the present invention, forming manner of the first catalytic portion on the surface of the cellular wall is not limited. Forming manner of the second catalytic portion on the inside surface of the pores is not limited, either.

The first loading layer is produced by a coated and calcined slurry in which the heat-resistant inorganic oxide powder is dispersed. The heat-resistant inorganic oxide powder forming the first loading layer preferably has an average particle diameter of 2 μm or more. By coating and calcining the slurry prepared by using the heat-resistant inorganic oxide powder of which average particle diameter is 2 μm or more, the first loading layer can be formed on the surface of the cellular wall. On the first loading layer, the first catalytic metal is loaded to form the first catalytic portion.

The first catalytic metal can be loaded on the first loading layer by one of two manners. In one manner, after the first loading layer was formed, the first catalytic metal is loaded on it. In the other manner, the first loading layer which has loaded the first catalytic metal therein is formed by the slurry in which the first catalytic metal was dispersed.

The second loading layer is produced by a coated and calcined slurry in which the heat-resistant inorganic oxide powder is dispersed. The heat-resistant inorganic oxide powder forming the second loading layer preferably has an average particle diameter smaller than 1 μm. By coating and calcining the slurry prepared by using the heat-resistant inorganic oxide powder of which average particle diameter is smaller than 1 μm, the second loading layer can be formed on the inside surface of the pores. On the second loading layer, the second catalytic metal is loaded to form the second catalytic portion.

The second catalytic metal can be loaded on the second loading layer by one of two manners. In one manner, after the second loading layer was formed, the second catalytic metal is loaded on it. In the other manner, the second loading layer which has loaded the second catalytic metal therein is formed by the slurry in which the second catalytic metal was dispersed.

A ratio of weight of the first catalytic portion to weight of the second catalytic portion can preferably range from 1:5 to 3:2. The filter catalyst of the present invention having such weight ratio of the first catalytic portion to the second catalytic portion, can achieve the increased purifying ability and the suppressed rise of the pressure loss. Here, the weights of the first catalytic portion and the second catalyst portion respectively correspond to weights of the first catalytic portion and the second catalytic portion formed on the filter catalyst of the present invention.

When the above weight ratio is smaller than 1:5, the first catalytic portion becomes excessively small, and thus the purifying ability of the exhaust gas decreases. On the contrary when the weight ratio is larger than 3:2, the second catalytic portion becomes excessively small, and thus the pressure loss rises.

As mentioned above, according to the filter catalyst of the present invention, the first catalytic portion can purify the gaseous component of the purified component, while the second catalytic portion can purify the particulates. That is, the filter catalyst of the present invention is comprised of (i) a catalyst-supporting substrate including a cellular wall demarcating plural cells of which opposite end openings are sealed alternately, the cellular wall being provided with multiple continuous pores, and (ii) a catalytic portion formed on an surface of the cellular wall for purifying the exhaust gas being discharged from a diesel engine and containing HC, CO, $NO_x$ and particulates.

The filter catalyst is characterized by that the catalytic portion for purifying the exhaust gas includes an upstream first catalytic portion for purifying HC, CO and $NO_x$, and a downstream second catalytic portion for purifying the particulates.

Such construction can bring a following effect. That is, reacting heat generated when HC, CO and $NO_x$ are purified at the upstream first catalytic portion is transferred to the downstream second catalytic portion. The transferred heat promotes decomposition and purification of the particulates captured by the second catalytic portion. As a result, the promoted decomposition and purification of the particulates captured on the pores shortens a time period during which the captured particulates close the pores. In this way, the pores are kept opening, so that rise of the pressure loss can be suppressed.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Hereinafter, the present invention will be explained based on Examples. As the Example of the present invention, a filter catalyst was manufactured.

Example 1

Figure 1:
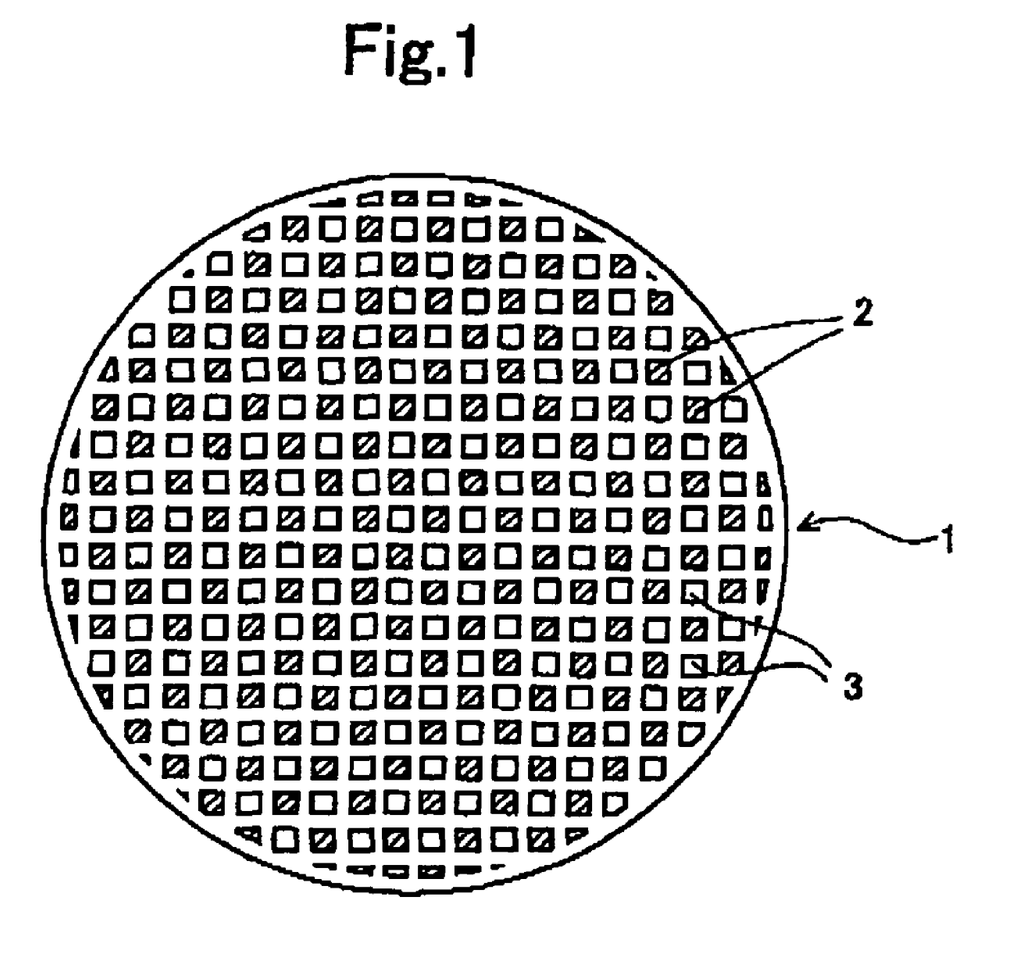
FIG. 1 is an upper view showing an end surface of a catalyst-supporting substrate.

Firstly, a slurry A to be coated on a catalyst-supporting substrate 1 shown in FIG. 1 was prepared. FIG. 1 is an upper end surface of a catalyst-supporting substrate 1. When preparing the slurry A, alumina ($Al_2O_3$) powder was put into a deionized water, and a solution was stirred so that the alumina powder was dispersed into the deionized water. Then, by subjecting the solution to a milling operation, the slurry A was prepared. The alumina dispersed into the slurry A has an average particle diameter of 0.8 μm.

Figure 2:
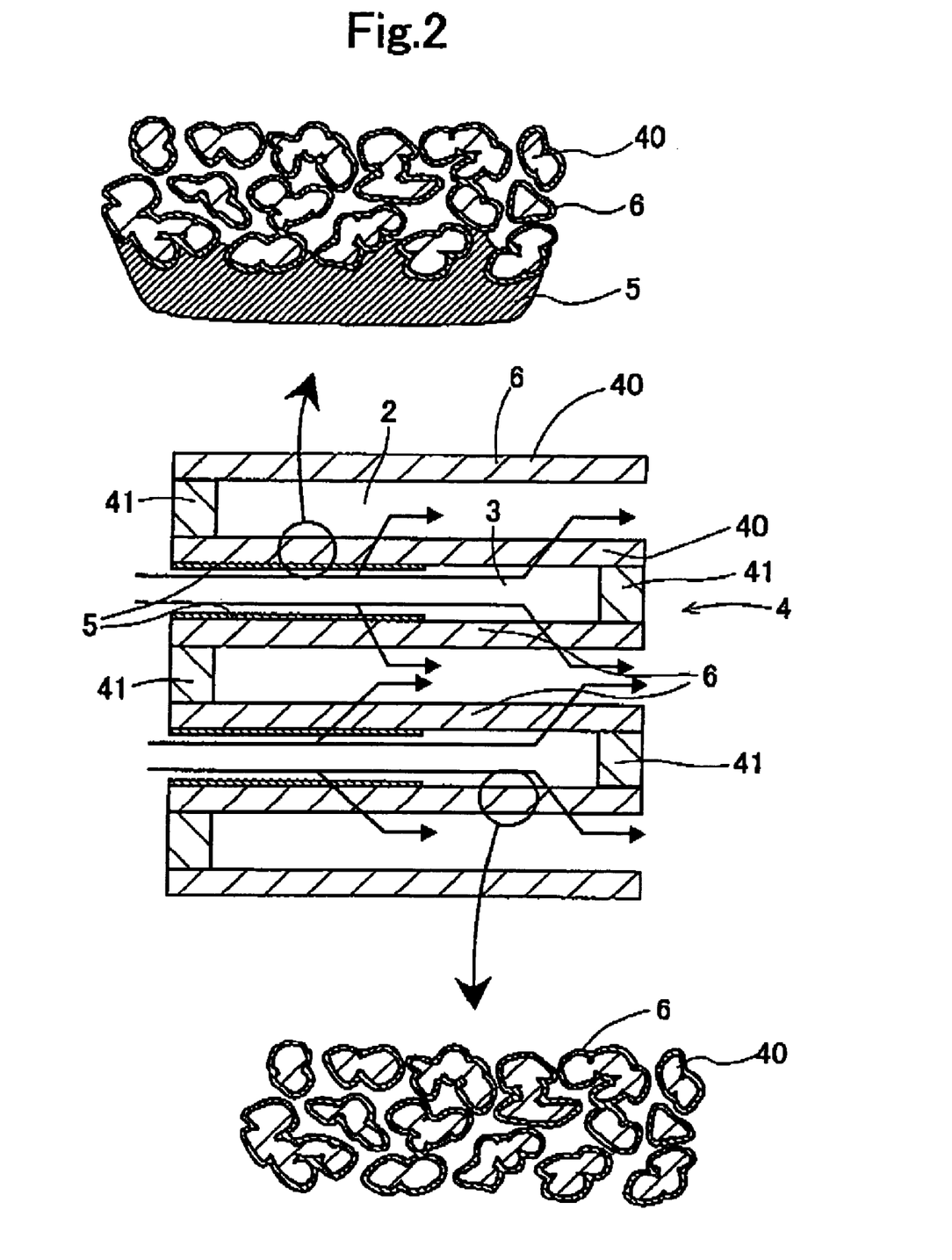
FIG. 2 is a cross-sectional view in an axial direction of a filter catalyst.

Then, the prepared slurry A was coated on the catalyst-supporting substrate 1, as shown in FIGS. 1 and 2. FIG. 2 is an axial cross-sectional view of a filter catalyst 4. The honeycomb-shaped catalyst-supporting substrate 1 made of a cordierite has substantially circular tubular shape as a whole, and has an outer diameter of 129 mm, an axial length of 150 mm and 2 liters apparent volume, respectively. The catalyst-supporting substrate 1 has plural cells 2 and plural cells 3 which extend axially and which are demarcated by cellular wall 40 including plural tubular wall portions having thickness of 300 μm.

48 cells are formed per 1 square cm (48 cells/$cm^2$, i.e., about 300 cells/$inch^2$). The catalyst-supporting substrate 1 is provided with multiple continuous pores having an average pore diameter of 30 μm in the cellular wall 40, and a porosity of 60% is established. One of two end openings formed at both axial ends of each cell is sealed by a sealing body 41 alternately. That is, about half of the plural cells are opened at one axial end surface, while rest of the plural cells are opened at other axial end surface. As a result, at opposite end surfaces of the catalyst-supporting substrate 1, the sealed cells 2 and the opened cells 3 are alternately positioned to form a checkered pattern.

Next, a coating of the slurry A onto the catalyst-supporting substrate 1 will be explained. When coating the slurry A, whole of the catalyst-supporting substrate 1 was dipped into the slurry A, and is taken out from it. Then, an excessive slurry A is removed by blowing an air into the cells 2 and 3 of the catalyst-supporting substrate 1. Then, catalyst-supporting substrate 1 was dried.

After drying, the catalyst-supporting substrate 1 was weighed. It was confirmed that the alumina was loaded by a loaded amount of 75 g, per 1 liter apparent volume of the catalyst-supporting substrate 1. Also confirmed was that the alumina loading layer was formed on the inside surface of pores of the whole cellular wall 40, in substantially uniform thickness.

Next, preparation and coating of a slurry B will be explained. Alumina powder having an average particle diameter of 5 μm was put into a deionized water, and a solution was stirred so that the alumina powder is dispersed into the deionized water.

The prepared slurry B was coated on the catalyst-supporting substrate 1 in which the alumina loading layer prepared by the slurry A was already formed. When coating the prepared slurry B, the catalyst-supporting substrate 1 was dipped into the slurry B in an area spreading from an upstream end (left end in FIG. 2) to a 75 mm point away from the upstream end. After the catalyst-supporting substrate 1 was taken out from the slurry B, an excessive slurry B was removed by blowing the air into the cells 2 and 3. Then, the catalyst-supporting substrate 1 was dried and calcined to complete the coating. Here, the slurry B was coated on the surface of the cellular wall 40 (more correctly, on inner surfaces of plural tubular wall portions) demarcating the cells 3 of which upstream openings are not sealed.

The calcined catalyst-supporting substrate 1 was weighed. The alumina produced by the slurry B was loaded by a loading amount of 75 g, per the 1 liter apparent volume of the catalyst-supporting substrate 1. It is confirmed that the alumina loading layer was formed on the surface of the cellular wall 40 demarcating the cells 3 of which upstream openings are not sealed, in the area spreading from the upstream end to a 75 mm point away from the upstream end, in substantially uniform thickness.

Then, an aqueous solution containing Pt was prepared. The catalyst-supporting substrate 1 on which two kinds of the loading layers were formed was dipped into the aqueous solution, taken out from it, and then dried. When drying, the catalyst-supporting substrate 1 was heated at 350° C. for 1 hour. As a result, 2 g of Pt was loaded on the alumina loading layers, per the 1 liter apparent volume of the catalyst-supporting substrate 1. Pt loaded on the loading layers uniformly, contributes as the catalytic component to burn the particulate contained in the exhaust gas.

Through the above-mentioned sequence, the filter catalyst 4 according to the Example 1 was manufactured. In this filter catalyst 4, the second loading layer produced by the slurry A was formed on the catalyst-supporting substrate 1 made of the cordierite. That is, the second loading layer was formed on the inside surfaces of the multiple continuous pores in the cellular wall 40, by the loading amount of 75 g/L.

Also, on the surface of the cellular wall 40 demarcating the cells 3 of which upstream openings are not sealed, the first loading layer produced by the slurry B is further formed. The first loading layer was formed on the surface in the area spreading from the upstream end to the 75 mm point away from the upstream end of the cellular wall 40, by the loading amount of 75 g/L. 2 g/L of Pt in total was loaded on the first loading layer and the second loading layer, to respectively form a first catalyst portion 5 and a second catalytic portion 6.

In the filter catalyst 4 of the Example 1, as shown in an upper part of FIG. 2, on the surface of the cellular wall 40 in the area spreading from the upstream end to the 75 mm point away from the upstream end, the second catalytic portion 6 is covered by the first catalytic portion 5. To the contrary, as shown in a lower part of FIG. 2, on the surface of the cellular wall 40 in the area spreading from the downstream end (right end in FIG. 2) to the 75 mm point away from the downstream end, the second catalytic portion 6 is exposed. In the filter catalyst of the Example 1, the length of the area on which the first catalytic portion is formed was ½ of that of the cellular wall. A weight ratio between the first catalytic portion 5 and the second catalytic portion 6 was 1:1.

Example 2

The slurry A was prepared and was coated on the catalyst-supporting substrate in the same manner as the Example 1, to form the second loading layer. The slurry A was coated on the whole catalyst-supporting substrate. After drying of the slurry A, the catalyst-supporting substrate was weighed. As a result, loading of the alumina by loading amount of 100 g per the 1 liter apparent volume of the catalyst-supporting substrate was confirmed. Also confirmed was that the alumina loading layer produced by the slurry A was formed on the inside surface of the pores of the cellular wall in substantially uniform thickness, similar to the second catalytic portion of the Example 1.

Then, the slurry 8 was prepared and coated on the catalyst-supporting substrate in the same manner as the Example 1, to form the first loading layer. The slurry B was coated on the surface of the cellular wall, in an area spreading from the upstream end to a 50 mm point away from the upstream end. The openings of the cells formed by the upstream end of the cellular wall are not sealed.

After calcining the slurry B, the catalyst-supporting substrate was weighed. As a result, loading of the alumina produced by the slurry B by loading amount of 50 g per the 1 liter apparent volume of the catalyst-supporting substrate was confirmed. Also confirmed was that the alumina loading layer was formed on the surface of the cellular wall in the area spreading from the upstream end to the 50 mm point away from the upstream end, in substantially uniform thickness. The openings of the cells formed by the upstream end of the cellular wall are not sealed.

Then, Pt was loaded on the second loading layer produced by the slurry A and the first loading layer produced by the slurry B, in the same manner as the Example 1. Through such sequence, the filter catalyst of the Example 2 was manufactured.

The filter catalyst of the Example 2 had same construction as that of the Example 1, except for the-following points. The first exception is that the first loading layer was formed by the loading amount of 50 g/L, on the surface of the cellular wall in the area spreading from the upstream end to the 50 mm point away from the upstream end. The second exception is that the second loading layer was loaded by the loading amount of 100 g/L.

In the filter catalyst of the Example 2, the length of the area on which the first catalytic portion is formed was ⅓ of that of the cellular wall. The weight ratio of the first catalytic portion to the second catalytic portion was 1:2.

Example 3

The slurry A was prepared in the same manner as the Example 1, and was coated on the catalyst-supporting substrate in the area spreading from the downstream end to a 75 mm point away from the downstream end, to form the second loading layer. After drying of the slurry A, the catalyst-supporting substrate was weighed. As a result, loading of the alumina by loading amount of 75 g per the 1 liter apparent volume of the catalyst-supporting substrate was confirmed. Also confirmed was that the alumina loading layer produced by the slurry A was formed on the inside surface of the pores of the cellular wall in substantially uniform thickness, similar to the second catalytic portion of the Example 1.

Then, the slurry B was prepared and coated on the catalyst-supporting substrate in the same manner as the Example 1, to form the first loading layer. The slurry B was coated on the surface in the area spreading from the upstream end to a 75 mm point away from the upstream end of the cellular wall. The openings formed by the upstream end of the cellular wall are not sealed.

After calcining the slurry B, the catalyst-supporting substrate was weighed. As a result, loading of the alumina produced by the slurry B by loading amount of 75 g per the 1 liter apparent volume of the catalyst-supporting substrate was confirmed. Also confirmed was that the alumina loading layer was formed on the surface in the area spreading from the upstream end to the 75 mm point away from the upstream end of the cellular wall, in substantially uniform thickness.

Then, Pt was loaded on the second loading layer produced by the slurry A and the first loading layer produced by the slurry B, in the same manner as the Example 1. Through such sequence, the filter catalyst of the Example 3 was manufactured.

In this filter catalyst, the second loading layer produced by the slurry A was formed on the catalyst-supporting substrate. It was formed on the inside surfaces of the multiple continuous pores in the cellular wall, in the area spreading from the downstream end to the 75 mm point away from the downstream end, by the loading amount of 75 g/L.

Also, on the surface of the cellular wall demarcating the cells of which upstream openings are not sealed, the first loading layer produced by the slurry B is further formed. The first loading layer was formed on the surface in the area spreading from the upstream end to the 75 mm point away from the upstream end of the cellular wall, by the loading amount of 75 g/L. 2 g/L of Pt in total was loaded on the first loading layer and the second loading layer, to respectively form a first catalyst portion and a second catalytic portion.

In the filter catalyst of the Example 3, on the surface of the cellular wall in the area spreading from the downstream end to the 75 mm point away from the downstream end, the second catalytic portion is exposed. In the filter catalyst of the Example 3, length of the upstream area on which the first catalyst portion is formed was ½ of that of the cellular wall. A weight ratio between the first catalytic portion and the second catalytic portion was 1:1.

Example 4

The slurry A was prepared in the same manner as the Example 1, and was coated on the catalyst-supporting substrate in the area spreading from the downstream end to a 120 mm point away from the downstream end, to form the second loading layer. After drying of the slurry A, the catalyst-supporting substrate was weighed. As a result, loading of the alumina by loading amount of 120 g per the 1 liter apparent volume of the catalyst-supporting substrate was confirmed. Also confirmed was that the alumina loading layer produced by the slurry A was formed on the inside surface of the pores of the cellular wall in substantially uniform thickness, similar to the second catalytic portion of the Example 1.

Then, the slurry B was prepared and coated on the catalyst-supporting substrate in the same manner as the Example 1, to form the first loading layer. The slurry B was coated on the surface in the area spreading from the upstream end to a 30 mm point away from the upstream end of the cellular wall. The openings formed by the upstream end of the cellular wall are not sealed.

After calcining the slurry B, the catalyst-supporting substrate was weighed. As a result, loading of the alumina produced by the slurry B by loading amount of 30 g per the 1 liter apparent volume of the catalyst-supporting substrate was confirmed. Also confirmed was that the alumina loading layer produced by the slurry B was formed on the surface in the area spreading from the upstream end to the 30 mm point away from the upstream end of the cellular wall, in substantially uniform thickness.

Then, Pt was loaded on the second loading layer produced by the slurry A and the first loading layer produced by the slurry B, in the same manner as the Example 1. Through such sequence, the filter catalyst of the Example 4 was manufactured.

The filter catalyst of the Example 4 had same construction as that of the Example 3, except for the following points. The first exception is that the first loading layer was formed by the loading amount of 30 g/L, on the surface in the area spreading from the upstream end to the 30 mm point away from the upstream end of the cellular wall. The second exception is that the second loading layer was loaded by the loading amount of 120 g/L, in the area spreading from the downstream end to the 120 mm point away from the downstream end of the cellular wall.

In the filter catalyst of the Example 4, the length of the area on which the first catalytic portion is formed was ⅕ of that of the cellular wall. The weight ratio of the first catalytic portion to the second catalytic portion was 1:4.

Example 5

The slurry A was prepared in the same manner as the Example 1, and was coated on the catalyst-supporting substrate in the area spreading from the downstream end to a 60 mm point away from the downstream end, to form the second loading layer. After drying of the slurry A, the catalyst-supporting substrate was weighed. As a result, loading of the alumina produced by the slurry A by loading amount of 60 g per the 1 liter apparent volume of the catalyst-supporting substrate was confirmed. Also confirmed was that the alumina loading layer produced by the slurry A was formed on the inside surface of the pores of the cellular wall in substantially uniform thickness, similar to the second catalytic portion of the Example 1.

Then, the slurry B was prepared and coated on the catalyst-supporting substrate in the same manner as the Example 1, to form the first loading layer. The slurry B was coated in the area spreading from the upstream end to the 90 mm point away from the upstream end of the cellular wall. The openings formed by the upstream end of the cellular wall are not sealed.

After calcining the slurry B the catalyst-supporting substrate was weighed. As a result, loading of the alumina produced by the slurry B by loading amount of 90 g per the 1 liter apparent volume of the catalyst-supporting substrate was confirmed. Also confirmed was that the alumina loading layer produced by the slurry B was formed on the surface in the area spreading from the upstream end to the 90 mm point away from the upstream end of the cellular wall, in substantially uniform thickness.

Then, Pt was loaded on the second loading layer produced by the slurry A and the first loading layer produced by the slurry B, in the same manner as the Example 1. Through such sequence, the filter catalyst of the Example 5 was manufactured.

The filter catalyst of the Example 5 had same construction as that of the Example 3, except for the following points. The first exception is that the first loading layer was formed by the loading amount of 90 g/L, on the surface in the area spreading from the upstream end to the 90 mm point away from the upstream end of the cellular wall. The second exception is that the second loading layer was loaded by the loading amount of 60 g/L, in the area spreading from the downstream end to the 60 mm point away from the downstream end of the cellular wall.

In the filter catalyst of the Example 5, the length of the area on which the first catalytic portion is formed was ⅗ of that of the cellular wall. The weight ratio of the first catalytic portion to the second catalytic portion was 3:2.

Comparative Example 1

The slurry A was prepared by the same manner as the Example 1. The prepared slurry A was coated on the catalyst-supporting substrate which is same as that of the Example 1. When coating the slurry A, the whole catalyst-supporting substrate was dipped into the slurry A, and taken out from it. After taking out the catalyst-supporting substrate, the air was blown into the cells of it to remove the excessive slurry A. Then, the catalyst-supporting substrate was dried and calcined After drying the slurry A, the catalyst-supporting substrate was weighed. It was confirmed that the alumina was loaded on the catalyst-supporting substrate by the loading amount of 150 g per the 1 liter apparent volume of the catalyst-supporting substrate. Also confirmed was the alumina loading layer produced by the slurry A was formed on the inside surface of the pores of the cellular wall, in substantially uniform thickness. Noted that the slurry B was not prepared and therefore was not coated on the catalyst-supporting substrate.

Next, Pt was loaded on the loading layer in the same manner as the Example 1. 2 g of Pt was loaded per the 1 liter apparent volume of the catalyst-supporting substrate.

Through the above sequence, the filter catalyst of the Comparative Example 1 was manufactured. In this filter catalyst, the loading layer produced by the slurry A was formed on the inside surface of the pores in the cellular wall, by the loading amount of 150 g/L. On the loading layer, Pt was loaded by the loading amount of 2 g/L.

Comparative Example 2

The slurry B was prepared by the same manner as the Example 1. The prepared slurry B was coated on the catalyst-supporting substrate which is same as that of the Example 1. When coating the slurry B, the whole catalyst-supporting substrate was dipped into the slurry B, and taken out from it. After taking out the catalyst-supporting substrate, the air was blown into the cells of it to remove the excessive slurry B. Then, the catalyst-supporting substrate was dried and calcined.

After drying the slurry B, the catalyst-supporting substrate was weighed. It was confirmed that the alumina was loaded on the catalyst-supporting substrate by the loading amount of 150 g per the 1 liter apparent volume of the catalyst-supporting substrate. Also confirmed was the alumina loading layer produced by the slurry B was dispersed on the surface of the cellular wall, in substantially uniform thickness. Noted that the slurry A was not prepared and therefore was not coated on the catalyst-supporting substrate.

Next, Pt was loaded on the loading layer in the same manner as the Example 1. 2 g of Pt was loaded per the 1 liter apparent volume of the catalyst-supporting substrate.

Through the above sequence, the filter catalyst of the Comparative Example 2 was manufactured. In this filter catalyst, the loading layer produced by the slurry B was formed on the surface of the cellular wall, by the loading amount of 150 g/L. On the loading layer, Pt was loaded by the loading amount of 2 g/L.

Evaluation

By purifying the exhaust gas by the filter catalysts of the Examples 1 to 5, and that of the Comparative Examples 1 and 2, the purifying ability of these filter catalysts were evaluated.

Measurement of 50% Purification Temperature

The filter catalysts of the Examples 1 to 5 and that of the Comparative Examples 1 and 2 were put into place in an exhaust system of a vehicle. This vehicle has a direct-injection and a supercharge type diesel engine which has 2 liters of displacement volume. With the revolution speed of 2000 rpm, torque was varied and catalyst temperature of the filter catalysts was raised from 150° C. up to 450° C.

Concentration of HC and concentration of CO in the exhaust gas in front of (upstream) the filter catalysts, and that at rear of (downstream) the filter catalysts were measured. Based on the measured concentrations of the exhaust gas which was not purified by the filter catalysts, and that which was purified by the filter catalysts, the purification rate of the exhaust gas was calculated, by using the following equation 1. Temperature of the filter catalysts when the purification rate reached 50% was measured to be used as a catalytic activity of the filter catalysts.

Figure 3:
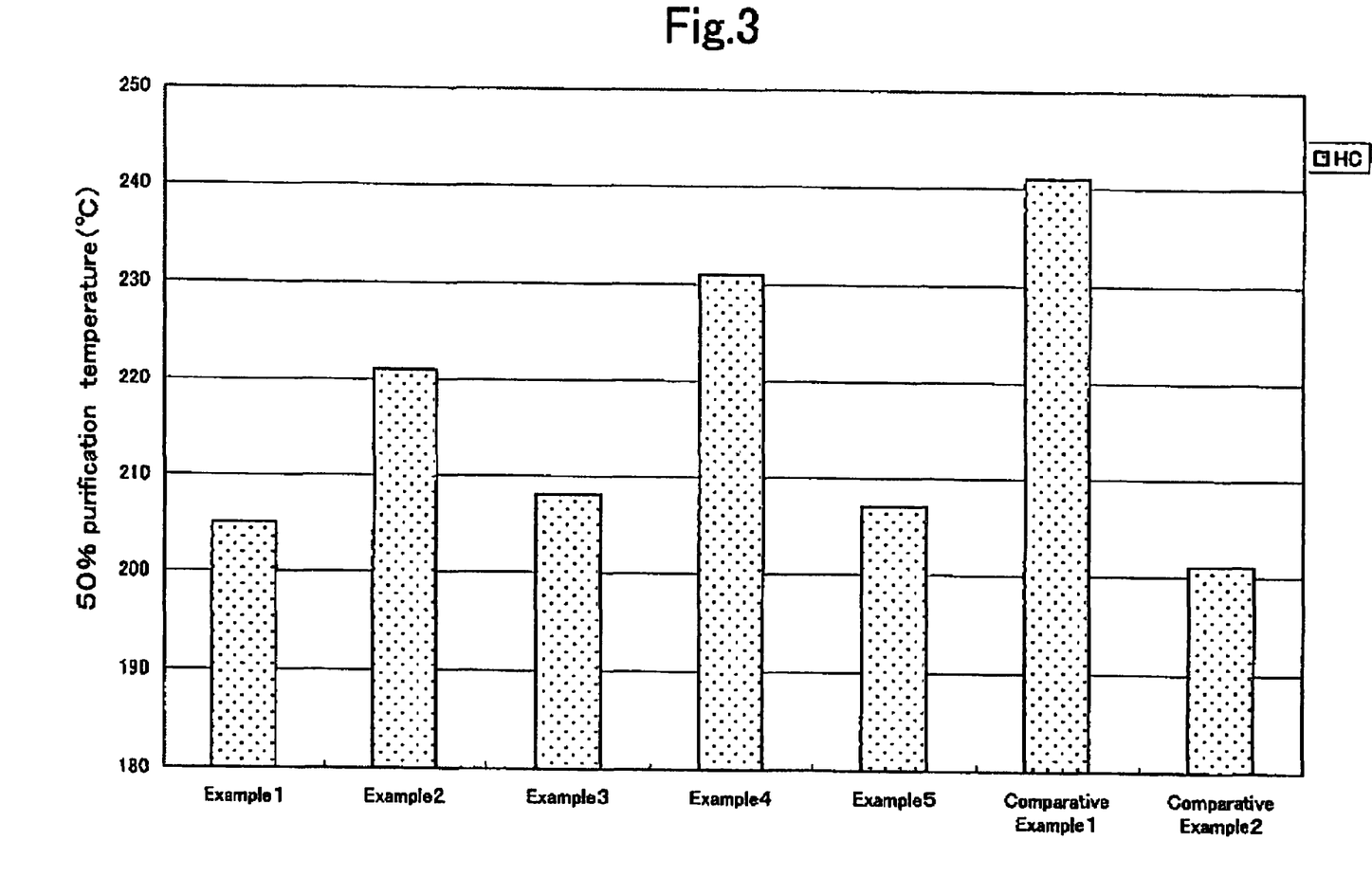
FIG. 3 is a graph showing calculated results of a 50% purification temperature in HC purification by filter catalysts.
Figure 4:
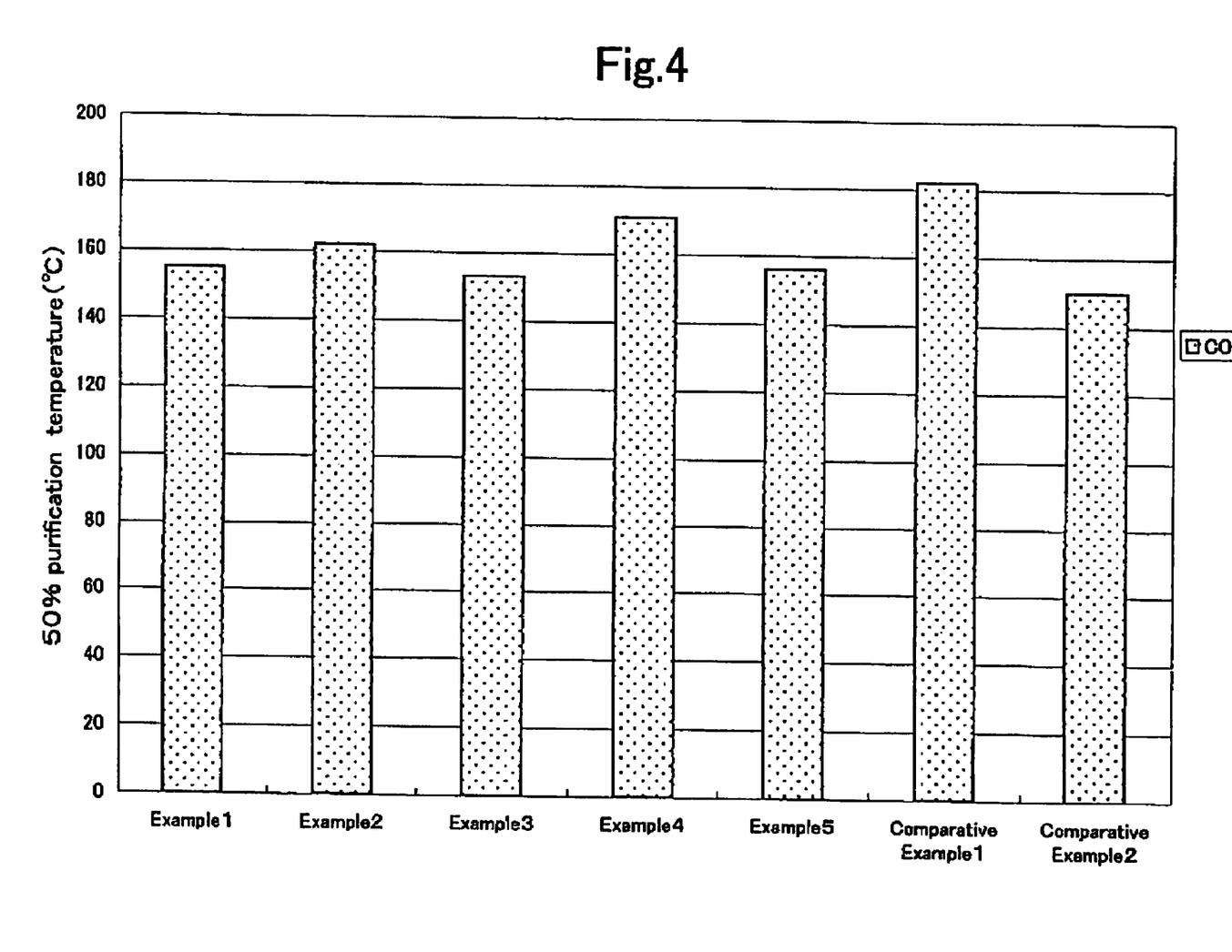
FIG. 4 is a graph showing calculated results of a 50% purification temperature in CO purification by filter catalysts.

The calculated results are shown in the Table 1 and FIGS. 3 to 4. Here, FIG. 3 shows the temperature of the filter catalysts when the SC purification rate by them reached 50%, which is shown in right side of the Table 1. FIG. 4 shows the temperature of the filter catalysts when the CO purification rate by them reached 50%, which is shown in left side of the Table 1.

$$\text{purified rate}(\%) = (\text{cbp(ppm)} - \text{cap(ppm)})/\text{cbp(ppm)} \times 100 \qquad [\text{Equation 1}]$$

Here, "cbp" is an abbreviation of concentration before purification, and "cap" is an abbreviation of concentration after purification, respectively.

TABLE 1

|  | CO-50% purification temperature (° C.) | HC-50% purification temperature (° C.) |
| --- | --- | --- |
| Example 1 | 155 | 205 |
| Example 2 | 162 | 221 |
| Example 3 | 153 | 208 |
| Example 4 | 171 | 232 |
| Example 5 | 156 | 207 |
| Com. Example 1 | 182 | 241 |
| Com. Example 2 | 150 | 201 |

Note:
Com. Example means Comparative Example

According to the Table 1 and FIGS. 3 to 4, each of the filter catalysts of the Examples 1 to 5 apparently has higher catalytic activity, that is, it has the lower CO-50% purification temperature and the lower HC-50% purification temperature than that of the Comparative Example 1. As mentioned above, in the filter catalyst of the Comparative Example 1, the catalytic portion was not formed on the surface of the cellular wall but was formed on the inside surface of the pores in the cellular wall.

Judging from it, it is guessed that the first catalytic portion formed on the surface of the cellular wall effectively functioned to purify the gaseous component.

Measurement of Particulate Purification Rate and Exhaust Pressure

The filter catalysts of the Examples 1 to 5 and that of the Comparative Examples 1 to 2 were put into place in exhaust system of a vehicle. This vehicle has a direct-injection type diesel engine which has 2.8 liters of displacement volume. In the exhaust system, in front of (upstream) and at rear of (downstream of the filter catalyst, pressure sensors were arranged. The diesel engine was operated by EC mode, and the particulates contained in the exhaust gas which passed through the filter catalyst were captured. Weight of the captured particulates was measured as the sum of a soluble component (SOF) and a soot.

Figure 5:
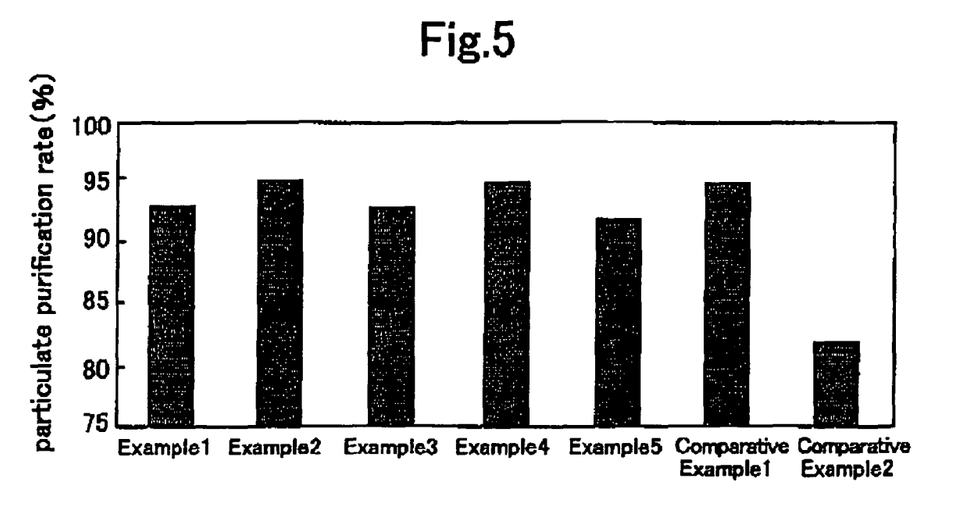
FIG. 5 is a graph showing calculated results of a purification rate of particulates by filter catalysts.

Then, the diesel engine was operated in the same condition as mentioned above, without putting the filter catalyst into place. The particulates contained in the exhaust gas were captured, and weight of them was measured. Based on the measured weight of the particulates, a purification rate of the particulates were calculated by using the following Equation 2. Calculated particulate purification rates of the particulates are shown in FIG. 5.

Figure 6:
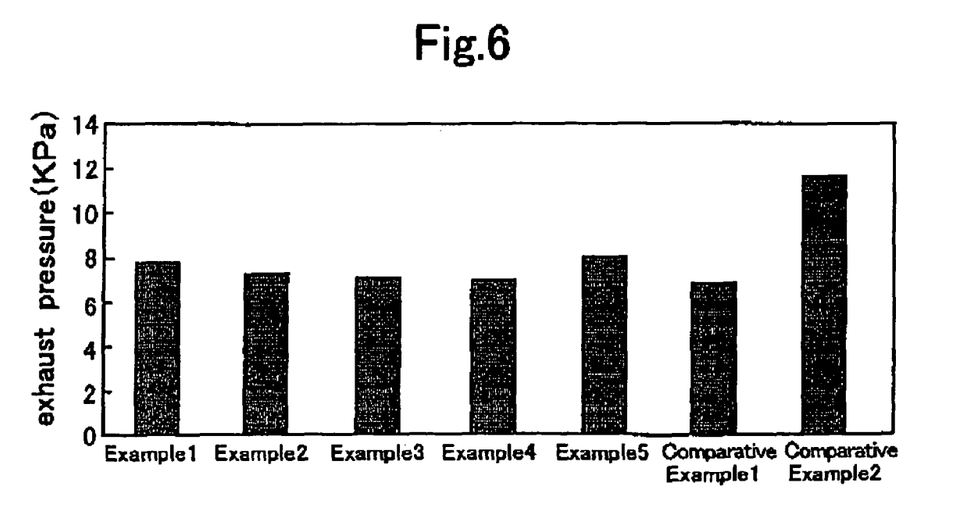
FIG. 6 is a graph showing calculated results of an exhaust pressure of filter catalysts.

Also, when capturing the particulates with the catalyst being put into place, pressure of the exhaust gas upstream of the filter catalyst, i.e., back pressure was measured. Measured exhaust pressures of the filter catalysts in the EC mode under the maximum speed are shown in FIG. 6.

$$\text{purified rate}(\%) = (\text{wbp}(mg) - \text{wap}(mg))/\text{wbp}(mg) \times 100 \quad \text{[Equation 2]}$$

Here, "wbp" is an abbreviation of weight before purification, and "wap" is an abbreviation of weight after purification, respectively.

As apparent from FIG. 5, each of the filter catalysts of the Examples 1 to 5 has the particulate purification rate which is higher than that of the Comparative Example 2, in which the catalytic portion was formed on the surface of the cellular wall. Judging from it, it is guessed that the second catalytic portion of the Example 1 to 5 formed on the inside surface of the pores functioned effectively, for purifying the particulates.

Also, as apparent from FIG. 6, each of the filter catalysts of the Examples 1 to 5 has the exhaust pressure which is lower than that of the Comparative Example 2, in which the catalytic portion was formed on the surface of the cellular wall. Judging from it, it is guessed that the second catalytic portion formed on the inside surface of the pores of the Examples 1 to 5 suppressed rise of the pressure loss effectively.

Through the above mentioned various evaluations, it was confirmed that the filter catalysts of the Examples 1 to 5 are excellent in purifying ability of the purified component, including the gaseous purified component of HC and CO, and granular purified component of the particulates. Also confirmed was that the filter catalysts of the Examples 1 to 5 are excellent in suppressing rise of the pressure loss.

Having now fully described the present invention, it will be apparent to one of ordinary skill in the art that many changes and modifications can be made thereto without departing from the spirit or scope of the present invention as set forth herein including the appended claims.

What is claimed is:

1. A filter catalyst, comprising:
   a catalyst-supporting substrate including a cellular wall demarcating plural cells of which opposite end openings are sealed alternately, the cellular wall being provided with multiple continuous pores;
   a first catalytic portion formed on a surface of a portion of the cellular wall, for decomposing and purifying a component to be purified contained in the exhaust gas, the first catalytic portion sealing the pores of the portion of the cellular wall of the catalyst-supporting substrate; and
   a second catalytic portion formed on an inside surface of the pores and forms a part of the cellular wall along the entire cellular wall, for decomposing and purifying a component to be purified contained in the exhaust gas,
   wherein the first catalytic portion purifies HC, CO and $NO_x$, and the second catalytic portion purifies particulates, and
   the first catalytic portion is formed only in an upstream area of the cellular wall in an area from the upstream end of the cellular wall along $1/5$ to $3/5$ the axial length of the cellular wall.

2. A filter catalyst set forth in claim 1, wherein the second catalytic portion is formed in an area of the cellular wall where the first catalytic portion is not formed.

3. A filter catalyst set forth in claim 1, wherein the first catalytic portion includes a first loading layer made of a heat-resistant inorganic oxide and a first catalytic metal loaded on the first loading layer, the first loading layer is produced by coating and calcining a slurry into which a heat-resistant inorganic oxide powder is dispersed, and an average particle diameter of the heat-resistant inorganic oxide powder of the first catalytic portion is 2 μm or more.

4. A filter catalyst set forth in claim 1, wherein the second catalytic portion includes a second loading layer made of a heat-resistant inorganic oxide and a second catalytic metal loaded on the second loading layer, the second loading layer is produced by coating and calcining a slurry into which a heat-resistant inorganic oxide powder is dispersed, and an average particle diameter of the heat-resistant inorganic oxide powder of the second catalytic portion is 1 μm or less.

5. A filter catalyst set forth in claim 1, wherein a weight ratio of the first catalytic portion to the second catalytic portion ranges from 1:5 to 3:2.

* * * * *